(12) United States Patent
Ishida

(10) Patent No.: US 10,025,538 B2
(45) Date of Patent: Jul. 17, 2018

(54) IMAGE FORMING SYSTEM, IMAGE FORMING APPARATUS AND RECORDING MEDIUM

(71) Applicant: KYOCERA Document Solutions Inc., Osaka (JP)

(72) Inventor: Takayuki Ishida, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/839,601

(22) Filed: Dec. 12, 2017

(65) Prior Publication Data

US 2018/0165042 A1 Jun. 14, 2018

(30) Foreign Application Priority Data

Dec. 12, 2016 (JP) .................................. 2016-240719

(51) Int. Cl.
*G06F 3/12* (2006.01)

(52) U.S. Cl.
CPC .......... *G06F 3/1204* (2013.01); *G06F 3/1236* (2013.01); *G06F 3/1292* (2013.01);
(Continued)

(58) Field of Classification Search
None
See application file for complete search history.

(56) References Cited

U.S. PATENT DOCUMENTS 7,839,517 B1* 11/2010 Kinjo .................. G06F 3/14
358/1.15
9,094,773 B2* 7/2015 Wyler ................. H04W 4/001
(Continued)

FOREIGN PATENT DOCUMENTS

JP 2014-232390 A 12/2014

*Primary Examiner* — Dung D Tran
(74) *Attorney, Agent, or Firm* — Hawaii Patent Services; Nathaniel K. Fedde; Kenton N. Fedde

(57) ABSTRACT

An image forming apparatus is made to be usable by a greater number of portable terminal apparatuses than a limited number of terminals. In an image forming system, a first portable terminal apparatus is registered in the image forming apparatus so as to be able to transmit job requests to the image forming apparatus using a specified peer-to-peer communication method, however a second portable terminal apparatus is not registered. The image forming apparatus, (a) reads by an image reading apparatus a device ID of the first portable terminal apparatus and a device ID of the second terminal apparatus. Then, the image forming apparatus, (b) transmits the device ID of the second portable terminal apparatus to the first portable terminal apparatus using the peer-to-peer communication method. The first portable terminal apparatus, (a) correlates the received device ID of the second portable terminal apparatus with the first portable terminal apparatus, and registers the device ID in the server. Then, the first portable terminal apparatus, (b) receives a job request that is issued by the second portable terminal apparatus, and transmits that job request to the image forming apparatus using the peer-to-peer communication method. The server transmits the job request received from the second portable terminal apparatus to the first portable terminal apparatus that is correlated with the device ID of that second portable terminal apparatus.

6 Claims, 4 Drawing Sheets

(52) U.S. Cl.
CPC .... *G06F 3/1285* (2013.01); *H04N 2201/0039* (2013.01); *H04N 2201/0041* (2013.01)

(56) References Cited

U.S. PATENT DOCUMENTS

| | | | | |
|---|---|---|---|---|
| 9,223,527 | B2* | 12/2015 | Utsumi | G06F 3/1268 |
| 9,438,663 | B2* | 9/2016 | Shimomoto | G06F 3/1204 |
| 9,542,547 | B2* | 1/2017 | Bhaskaran | G06F 21/34 |
| 9,851,930 | B2* | 12/2017 | Lenin | G06F 3/1222 |
| 9,876,939 | B2* | 1/2018 | Soejima | H04N 1/4433 |
| 2014/0359737 | A1 | 12/2014 | Ishizu | |
| 2015/0092233 | A1* | 4/2015 | Park | G06F 3/1288 |
| | | | | 358/1.15 |
| 2016/0092149 | A1* | 3/2016 | Nojima | G06F 3/1292 |
| | | | | 358/1.15 |
| 2016/0253136 | A1* | 9/2016 | Adachi | G06F 3/1238 |
| | | | | 358/1.14 |

\* cited by examiner

IMAGE FORMING SYSTEM, IMAGE FORMING APPARATUS AND RECORDING MEDIUM

INCORPORATION BY REFERENCE

This application is based on and claims the benefit of priority from Japanese Patent Application No. 2016-240719 filed on Dec. 12, 2016, the contents of which are hereby incorporated by reference.

BACKGROUND

The present disclosure relates to an image forming system, an image forming apparatus and a recording medium.

Related Technology

A certain image forming apparatus can be operated from a portable terminal apparatus.

Moreover, in recent years, peer-to-peer communication such as Wi-Fi Direct®, Bluetooth® and the like is possible between an image forming apparatus such as a MFP and the like and a portable terminal apparatus such as a smartphone and the like.

SUMMARY

The image forming system according to the present disclosure includes an image forming apparatus, a first portable terminal apparatus, at least one second portable terminal apparatus and a server. The first portable terminal apparatus is registered in the image forming apparatus so as to be able to transmit job requests to the image forming apparatus using a specified peer-to-peer communication method. The second portable terminal apparatus is not registered in the image forming apparatus so as to be able to transmit a job request to the image forming apparatus using the specified peer-to-peer communication method. The image forming apparatus, (a) optically scans and reads by an image reading apparatus a device ID of the first portable terminal apparatus and a device ID of the second terminal apparatus that are respectively displayed by the first portable terminal apparatus and the second portable terminal apparatus that are placed on a platen glass. Then the image forming apparatus, (b) transmits the device ID of the second portable terminal apparatus to the first portable terminal apparatus using the peer-to-peer communication method. The first portable terminal apparatus, (a) receives the device ID of the second portable terminal apparatus from the image forming apparatus using the peer-to-peer communication method, and then correlates the received device ID of the second portable terminal apparatus with the first portable terminal apparatus, and registers the device ID in the server. Then the first portable terminal apparatus, (b) receives a job request that is issued by the second portable terminal apparatus from the server, and then transmits the received job request to the image forming apparatus using the peer-to-peer communication method. The server receives the job request that is issued by the second portable terminal apparatus from the second portable terminal apparatus, and then identifies the first portable terminal apparatus that is correlated with the device ID of that second portable terminal apparatus, and transmits the received job request to the identified first portable terminal apparatus.

The image forming apparatus according to the present disclosure is an image forming apparatus that is capable of receiving a job request using a specified peer-to-peer communication method. The image forming apparatus includes an image reading apparatus and a wireless communication apparatus. The image reading apparatus optically scans and reads a device ID of a first portable terminal apparatus and a device ID of a second terminal apparatus that are respectively displayed by the first portable terminal apparatus and the second portable terminal apparatus that are placed on a platen glass. The wireless communication apparatus transmits the device ID of the second portable terminal apparatus to the first portable terminal apparatus using the peer-to-peer communication method. Here, the first portable terminal apparatus is registered in the image forming apparatus so as to be able to transmit job requests to the image forming apparatus using the specified peer-to-peer communication method. The second portable terminal apparatus is not registered in the image forming apparatus so as to be able to transmit a job request to the image forming apparatus using the specified peer-to-peer communication method.

The recording medium according to the present disclosure is a non-transitory computer readable recording medium that stores a computer executable program. The program causes a computer inside a first portable terminal apparatus that is registered in the image forming apparatus so as to be capable of transmitting a job request to the image forming apparatus using a specified peer-to-peer communication method to execute the steps described below. (1) A step of receiving a device ID of a second portable terminal apparatus that is not registered in the image forming apparatus so as to be capable of transmitting a job request to the image forming apparatus using the specified peer-to-peer communication method from the image forming apparatus using the peer-to-peer communication method. (2) A step of correlating the received device ID of the second portable terminal apparatus with the first portable terminal apparatus and registering that device ID in the server. (3) A step of receiving a job request that is issued by the second portable terminal apparatus from the server, and transmitting the received job request to the image forming apparatus using the peer-to-peer communication method.

DETAILED DESCRIPTION

Embodiments according to the present disclosure will be explained below based on the drawings.

Figure 1:
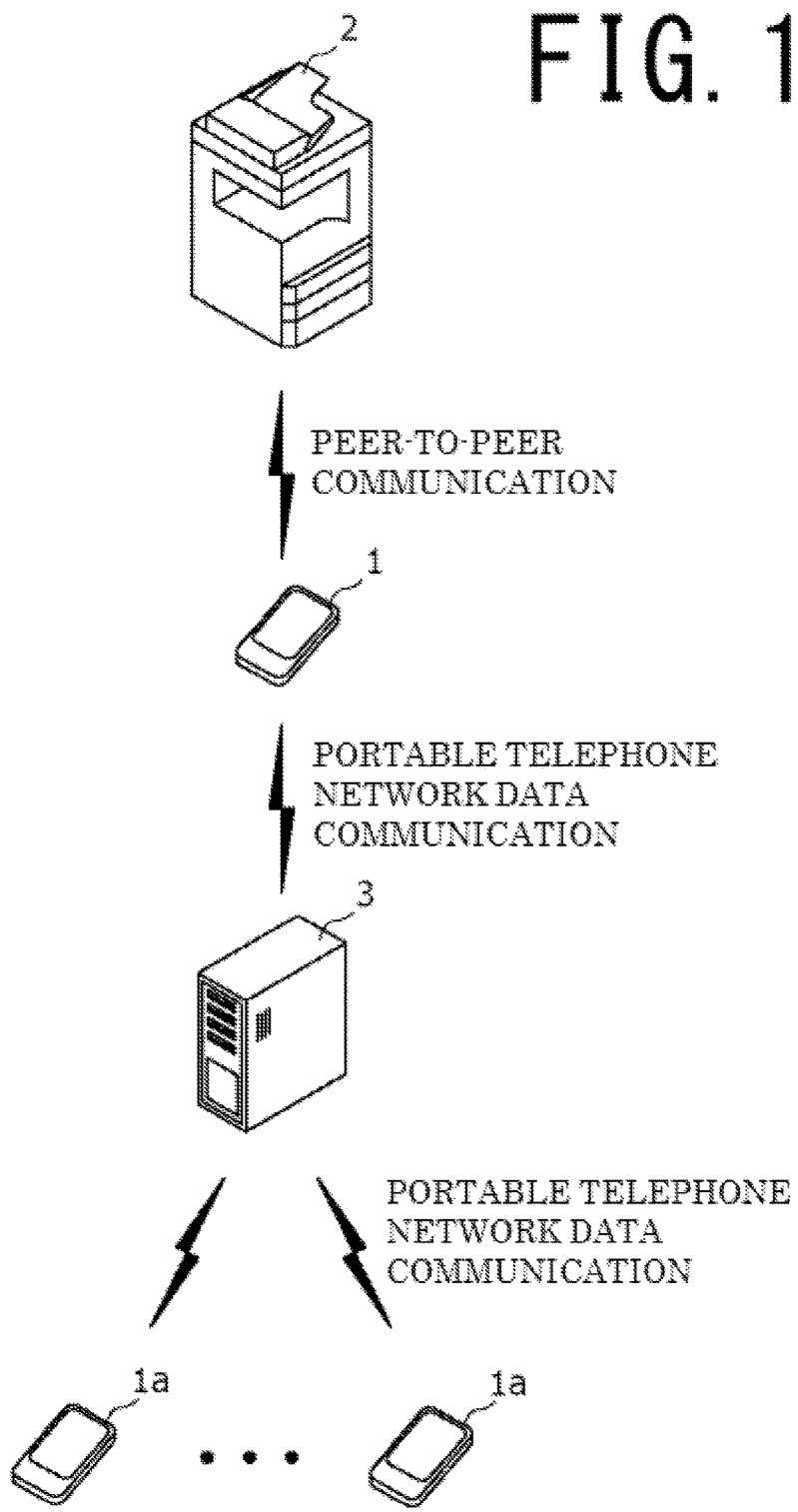
FIG. 1 illustrates the configuration of an image forming system according to an embodiment of the present disclosure.

FIG. 1 illustrates the configuration of an image forming system according to an embodiment of the present disclosure. In the system illustrated in FIG. 1, plural users each have their own respective portable terminal apparatus 1 or portable terminal apparatus 1a such as a smartphone and the like. Furthermore, in the system illustrated in FIG. 1, an image forming apparatus 2 (MFP, copier, facsimile and the like) is arranged at the base (office and the like) of these users. Moreover, an API server 3 is provided that is accessible from the portable terminal apparatuses 1, 1*a* via a portable telephone network and the Internet.

In the system illustrated in FIG. 1, the image forming apparatus 2 is capable of receiving job requests (printing requests and the like) from a specified number of portable terminal apparatuses or less using a specified peer-to-peer communication method such as Wi-Fi Direct®, Bluetooth® and the like. In other words, the image forming apparatus 2 is capable of receiving job requests using that peer-to-peer communication from a specified number of portable terminal apparatuses or less that have been registered beforehand.

Here, the portable terminal apparatus 1 is registered in the image forming apparatus 2 so as to be able to transmit a job request to the image forming apparatus 2 using that specified peer-to-peer communication method. The portable terminal apparatuses 1*a* are not registered in the image forming apparatus 2 so as to be able transmit a job request to the image forming apparatus 2 using that specified peer-to-peer communication method.

Figure 2:
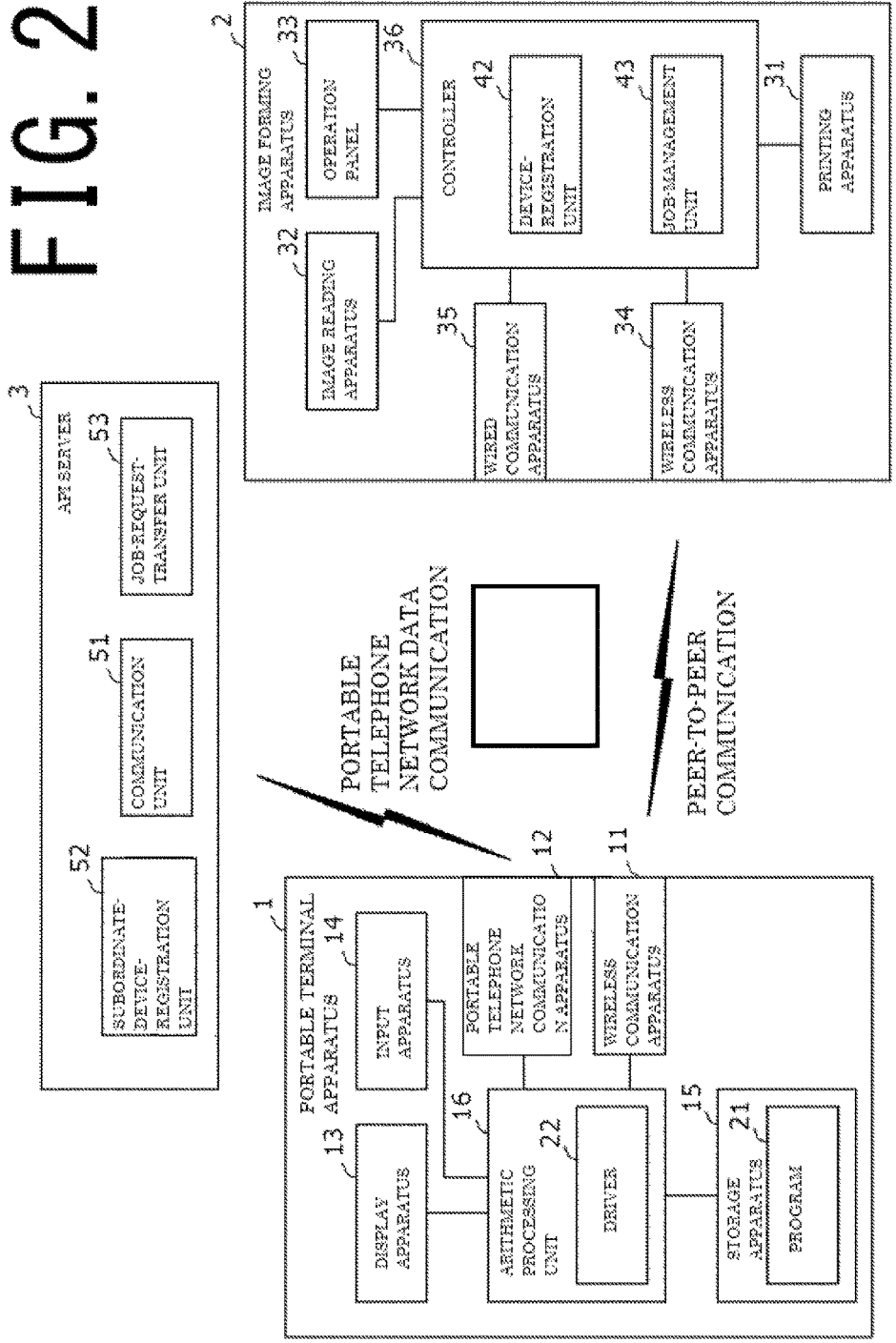
FIG. 2 is a block diagram illustrating the configuration of the portable terminal apparatus 1, the image forming apparatus 2 and the server 3 in FIG. 1.

FIG. 2 is a block diagram illustrating the configuration of the portable terminal apparatus 1, the image forming apparatus 2 and the API server 3 in FIG. 1. The configuration of the portable terminal apparatuses 1*a* is the same as that of the portable terminal apparatus 1.

The portable terminal apparatus 1 is, for example, a portable device such as a smartphone and the like, and includes a wireless communication apparatus 11, a portable telephone network communication apparatus 12, a display apparatus 13, an input apparatus 14, a storage apparatus 15, an arithmetic processing unit 16 and the like.

The wireless communication apparatus 11 is an internal apparatus that performs data communication by a specified wireless communication standard such as wireless LAN, Bluetooth® and the like. Wireless communication using the peer-to-peer communication method above is performed by the wireless communication apparatus 11.

The portable telephone network apparatus 12 is a wireless communication apparatus that can connect to a portable telephone network, and performs data communication and voice communication.

The display apparatus 13 is an internal apparatus such as a liquid-crystal display that displays an operation screen and the like for a user. The input apparatus 14 is an internal apparatus such as a touch panel that detects user operation.

The storage apparatus 15 is a nonvolatile storage apparatus such as a flash memory, hard disk and the like. A program 21 and the like are stored in the storage apparatus 15.

The arithmetic processing apparatus 16 is a computer having a CPU, RAM, ROM and the like, and achieves functioning as a driver 22 by loading the program 21 in RAM and executing the program 21 by the CPU.

The driver 22 of the portable terminal apparatus 1 uses the wireless communication apparatus 11 to transmit a job request to the image forming apparatus 2 using the peer-to-peer communication method above.

Moreover, after receiving a device ID of a portable terminal apparatus 1*a* from the image forming apparatus 2 using the peer-to-peer communication method above, the driver 22 of the portable terminal apparatus 1 correlates the received device ID of the portable terminal apparatus 1*a* with the portable terminal apparatus 1, then transmits the device ID to the API server 3 and registers the device ID in the API server 3.

Furthermore, after the driver 22 of the portable terminal apparatus 1 receives a job request from the API server 3 that is correlated with the portable terminal apparatus 1 and registered in the API server 3 and that is issued by a portable terminal apparatus 1*a*, the driver 22 of the portable terminal 1 transmits the received job request to the image forming apparatus 2 using the peer-to-peer communication method above.

The driver 22 of the portable terminal apparatus 1*a* transmits a job request to the API server 3 without transmitting the job request to the image forming apparatus 2 in the peer-to-peer communication method above.

On the other hand, in FIG. 2, the image forming apparatus 2 is a MFP or the like that is used by plural registered users, and includes a printing apparatus 31, an image reading apparatus 32, an operation panel 33, a wireless communication apparatus 34, a wired communication apparatus 35 and a controller 36.

The printing apparatus 31 is an internal apparatus that prints images one page at a time on printing paper by electrophotography based on printing image data.

The image reading apparatus 32 is an internal apparatus that optically scans and reads an image of an object that is on the platen glass, and generates image data for the image.

The operation panel 33 is arranged on the surface of the frame of the image forming apparatus 2 and has a display apparatus that displays various information to the user, and an input apparatus that receives user operation. A liquid-crystal display is used for example as the display apparatus. Key switches, a touch panel and the like are used as the input apparatus.

The wireless communication apparatus 34 is an internal apparatus that performs data communication by a specified wireless communication standard such as wireless LAN, Bluetooth (registered trademark) and the like. Wireless communication using the peer-to-peer method described above is performed by the wireless communication apparatus 34.

The wired communication apparatus 35 is a circuit that is connected to a network such as a wired LAN or the like, and performs data communication with other apparatuses that are connected to that network.

Moreover, the controller 36 has a computer, an ASIC and the like, and together with controlling the internal apparatuses inside the image forming apparatus 2, executes various data processing. The controller 36 operates as a device-registration unit 42, and job-management unit 43.

The device-registration unit 42 registers a portable terminal apparatus that can transmit job requests using the specified peer-to-peer communication method that uses the wireless communication apparatus 34. In other words, job requests using the peer-to-peer communication method that are from a portable terminal apparatus (the portable terminal apparatus 1 above) that is already registered by the device-registration unit 42 are allowed, and job requests using the peer-to-peer communication method that are from a portable terminal apparatus (a portable terminal apparatus 1*a* above) that is not registered are rejected.

Figure 3:
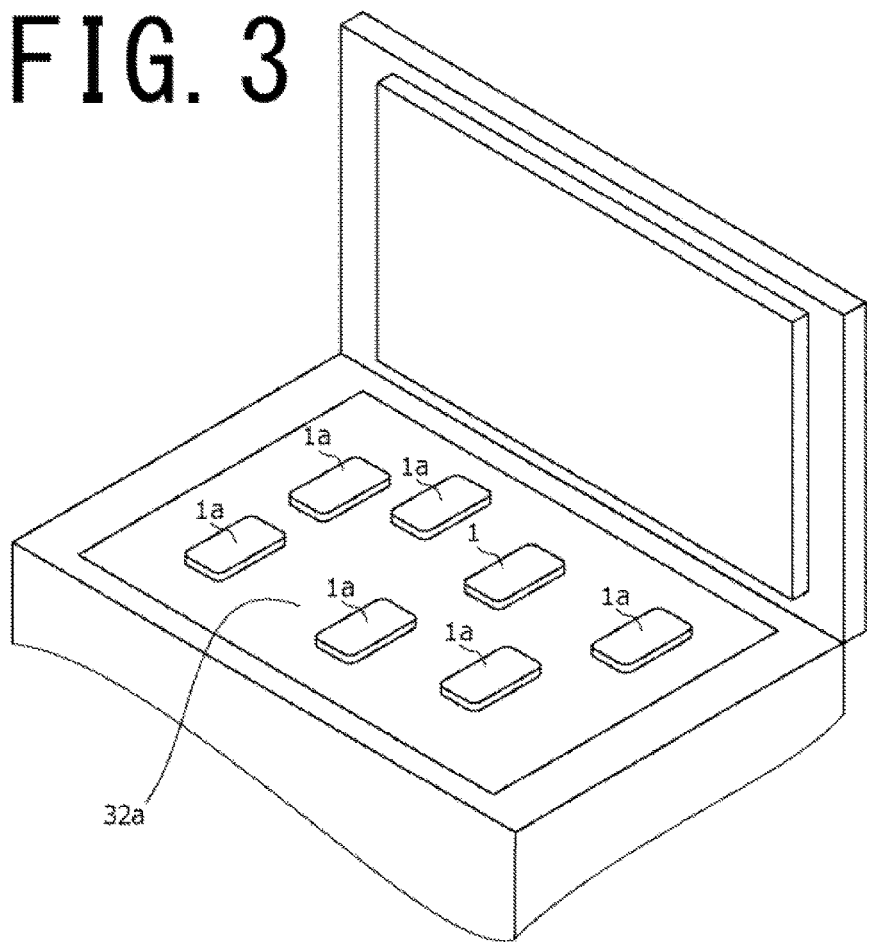
FIG. 3 is a perspective view illustrating an example of plural portable terminal apparatuses 1, 1a that are placed on the image reading apparatus 32 in FIG. 1.

FIG. 3 is a perspective view illustrating an example of plural portable terminal apparatuses 1, 1*a* that are placed on the image reading apparatus 32 in FIG. 1.

The device registration unit 42, (a) optically scans and reads, by the image reading apparatus 32, the device ID of the portable terminal apparatus 1 and the device IDs of the portable terminal apparatuses 1*a* that are respectively displayed by the portable terminal apparatus 1 and portable terminal apparatuses 1*a* that are placed on the platen glass 32a of the image reading apparatus 32 as illustrated in FIG. 3. Then, the device registration unit 42, (b) uses the wireless communication apparatus 34 and transmits the device IDs of portable terminal apparatuses 1a to the portable terminal apparatus 1 using the peer-to-peer communication method above.

In other words, the drivers 22 of the portable terminal apparatus 1 and the portable terminal apparatuses 1a display an identification screen that includes the device ID of the apparatus on display apparatus 13 according to user operation of the input apparatus 14. In that state, the user places the portable terminal apparatus 1 and portable terminal apparatuses 1a on the platen glass 32a with the display screens facing downward. As a result, an image of the device ID is included in the scanning image that is obtained by the image reading apparatus 32.

Moreover, the device-registration unit 42, (a) identifies the device ID of the portable terminal apparatus 1 and the device IDs of the portable terminal apparatuses 1a in the scanned image that is read by scanning one time. Then, the device-registration unit 42, (b) searches the identified device ID of the portable terminal apparatus 1 and the device IDs of the portable terminals 1a for the device ID of the portable terminal apparatus 1 that is registered in the image forming apparatus 2, identifies the device ID of the portable terminal apparatus 1, and identifies the device IDs of the portable terminal apparatuses 1a other than the device ID of the portable terminal apparatus 1.

Furthermore, the drivers 22 of the portable terminal apparatus 1 and the portable terminal apparatuses 1a display, by the display apparatus 13, an identification screen that includes a visible code (visible codes such as QR Code® or the like in which the device ID is encoded) that indicates the device ID. The image forming apparatus 2 may also detect visible code inside a scanned image and identify the device ID by decoding the visible code.

The job-management unit 43 uses the wireless communication apparatus 34 or wired communication apparatus 35 to receive a job request, and uses an internal apparatus such as the printing apparatus 31, image reading apparatus 32 and the like to execute a job (printing job or the like) instructed by the received job request.

On the other hand, the API server 3 includes a communication unit 51, a subordinate-device-registration unit 52 and a job-request-transfer unit 53.

The communication unit 51 is connected to the Internet, and, via the Internet and the portable telephone communication network, performs data communication with the portable terminal apparatuses 1, 1a.

The subordinate-device-registration unit 52 manages the correlation of portable terminal apparatuses 1a (the device ID) that are not registered in the image forming apparatus 2 with the portable terminal apparatus 1 (the device ID) that is registered in the image forming apparatus 2 according to a request from the portable terminal apparatus 1 that is registered in the image forming apparatus 2.

The job-request-transfer unit 53 transfers a job request from a portable terminal 1a that is not registered in the image forming apparatus 2 to the portable terminal apparatus 1 that is correlated with that portable terminal apparatus 1a. For example, the API server 3 is a server that executes a push notification such as a GCM, APNS and the like, and transfers a job request to the portable terminal apparatus 1 by a push notification.

Figure 4:
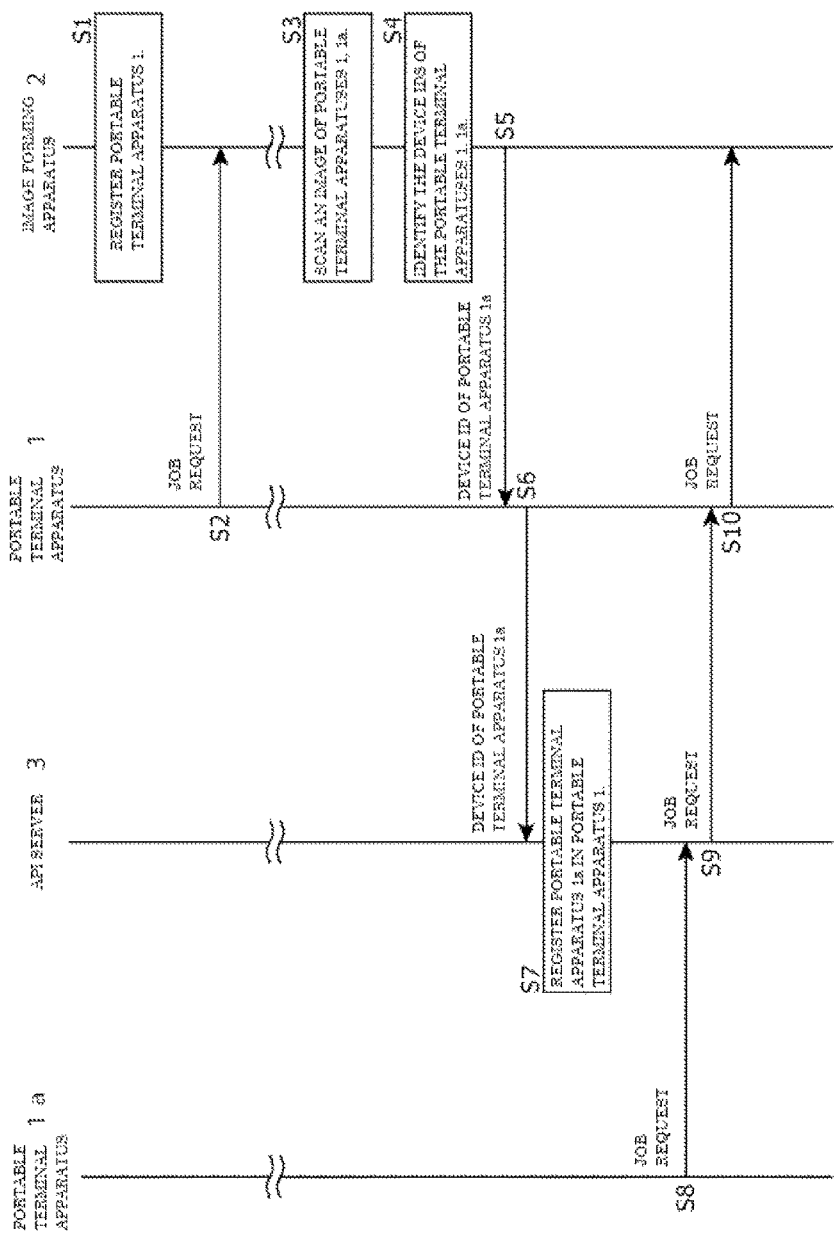
FIG. 4 is a sequence diagram for explaining the operation of the image forming system illustrated in FIG. 1 and FIG. 2.

Next, the operation of the image forming system above will be explained. FIG. 4 is a sequence diagram for explaining the operation of the image forming system illustrated in FIG. 1 and FIG. 2.

First, the image forming apparatus 2, based on a user operation or the like, performs registration of the portable terminal apparatus (in other words, portable terminal apparatus 1) of a user (step S1). After that, the portable terminal apparatus 1 is capable of transmitting a job request to the image forming apparatus 2 using a specified peer-to-peer communication method (step S2).

After that, a user of a portable terminal apparatus 1a is not able to register the portable terminal apparatus 1a that is not registered in the image forming apparatus 2 in the image forming apparatus 2 due to a restriction on the number of terminals that can be registered, however, when the user desires to use the image forming apparatus 2 with that portable terminal 1a, the user of portable terminal apparatus 1 or portable terminal apparatus 1a places the registered portable terminal apparatus 1 and the unregistered portable terminal 1a on the platen glass 32a in a state with the respective device ID being displayed on the registered portable terminal apparatus 1 or the unregistered portable terminal apparatus 1a.

Then, the image forming apparatus 2, according to a user operation, scans an image of the portable terminal apparatus 1 and portable terminal apparatus 1a that are placed on the platen glass 32a (step S3). Then, as described above, the image forming apparatus 2 identifies the device ID of the portable terminal apparatus 1 and the device ID of the portable terminal apparatus 1a (step S4), and transmits the device ID of the portable terminal apparatus 1a to the portable terminal apparatus 1 using peer-to-peer communication (step S5).

After receiving the device ID of the portable terminal apparatus 1a using peer-to-peer communication, the portable terminal apparatus 1 transmits that device ID together with its own device ID to the API server 3 (step S6).

After receiving the device ID of the portable terminal apparatus 1 and the device ID of the portable terminal apparatus 1a, the API server 3 correlates the device ID of the portable terminal apparatus 1a with the device ID of the portable terminal apparatus 1, and registers the device ID of the portable terminal apparatus 1a (step S7).

After the device ID of the portable terminal apparatus 1a is registered in the API server 3 in this way, the portable terminal apparatus 1a is able to use the image forming apparatus 2 via the API server 3 and the portable terminal apparatus 1 (steps S8 to S10). In other words, after the portable terminal apparatus 1a transmits a job request to the API server 3 (step S8), the API server 3 transfers that job request to the portable terminal apparatus 1 (step S9), and the portable terminal apparatus 1 transmits that job request to the image forming apparatus 2 using peer-to-peer communication (step S10). As a result, the image forming apparatus 2 executes a job according to the job request that is issued by the portable terminal apparatus 1a.

As described above, according to the embodiment above, the portable terminal apparatus 1 is registered in the image forming apparatus 2 so as to be able to transmit job requests to the image forming apparatus 2 using a specified peer-to-peer communication method. Moreover, the portable terminal apparatus 1a is not registered in the image forming apparatus 2 so as to be able to transmit a job request to the image forming apparatus 2 using a specified peer-to-peer communication method. The image forming apparatus 2, (a) optically scans and reads, by the image reading apparatus 32, the device ID of the portable terminal apparatus 1 and the device ID of the portable terminal apparatus 1a that are respectively displayed by the portable terminal apparatus 1 and the portable terminal apparatus 1a that are placed on the platen glass 32a. Then, the image forming apparatus 2, (b) transmits the device ID of the portable terminal apparatus 1a to the portable terminal apparatus 1 using peer-to-peer communication. The portable terminal apparatus 1, (a) receives the device ID of the portable terminal apparatus 1a from the image forming apparatus 2 using that peer-to-peer communication method, and then correlates the received device ID of the portable terminal apparatus 1a with the portable terminal apparatus 1 and registers the device ID of the portable terminal apparatus 1a in the API server 3. The portable terminal apparatus 1 then, (b) receives a job request that is issued by the portable terminal apparatus 1a from the API server 3, and transmits the received job request to the image forming apparatus 2 using the peer-to-peer communication method. After receiving a job request that is issued by the portable terminal apparatus 1a from a portable terminal apparatus 1a, the API server 3 identifies the portable terminal 1 that is correlated with the device ID of that portable terminal apparatus 1a. Then, the API server 3 transmits the received job request to the identified portable terminal apparatus 1.

As a result, it becomes possible to use the image forming apparatus 2 by a number of portable terminal apparatuses 1, 1a that is larger than the limited number of terminals.

Moreover, by a simple operation, it is possible for one or more portable terminal apparatuses 1a that are not registered in the image forming apparatus 2 to use the image forming apparatus 2 via a portable terminal apparatus 1. This is particularly convenient when it is possible to use a portable terminal apparatus 1a that is not registered in the image forming apparatus 2.

Various changes and modifications to the embodiment described above will be apparent to one skilled in the art. Such changes and modifications may be performed without departing from the spirit and scope of the subject matter, and without diminishing the intended advantages. In other words, such changes and modifications are intended to be included within the scope of the claims.

For example, in the embodiment described above, when a job request is not generated from the portable terminal apparatus 1a within a specified time, the API server 3 may discard the registration of the portable terminal apparatus 1a. As a result, registration of the portable terminal apparatus 1a is automatically discarded after use of the image forming apparatus 2 by the portable terminal apparatus 1a is finished, and after that, the portable terminal apparatus 1a is not able to use the image forming apparatus 2, so security is increased.

In the typical example described above, the number of portable terminal apparatuses that can access an image forming apparatus using peer-to-peer communication may be limited to a specified number of terminals or less. Even when in an office or the like many users use an image forming apparatus with a portable terminal apparatus, it is possible for a portable terminal apparatus having usage authority to use the image forming apparatus. However, a portable terminal apparatus that does not have usage authority is not able to use the image forming apparatus.

However, according to the present disclosure, it becomes possible for more than the limited number of portable terminal apparatuses to use the image forming apparatus.

The technology according to the present disclosure can be applied to an image forming apparatus that is installed in an office or the like.

What is claimed is:

1. An image forming system, comprising:
an image forming apparatus;
a first portable terminal apparatus that is registered in the image forming apparatus so as to be able to transmit job requests to the image forming apparatus using a specified peer-to-peer communication method; and
at least one second portable terminal apparatus that is not registered in the image forming apparatus so as to be able to transmit a job request to the image forming apparatus using the specified peer-to-peer communication method; and
a server; wherein
the image forming apparatus, (a) optically scans and reads by an image reading apparatus a device ID of the first portable terminal apparatus and a device ID of the second terminal apparatus that are respectively displayed by the first portable terminal apparatus and the second portable terminal apparatus that are placed on a platen glass, and (b) transmits the device ID of the second portable terminal apparatus to the first portable terminal apparatus using the peer-to-peer communication method;
the first portable terminal apparatus, (a) receives the device ID of the second portable terminal apparatus from the image forming apparatus using the peer-to-peer communication method, and then correlates the received device ID of the second portable terminal apparatus with the first portable terminal apparatus, and registers the device ID in the server, and (b) receives a job request that is issued by the second portable terminal apparatus from the server, and then transmits the received job request to the image forming apparatus using the peer-to-peer communication method; and
the server receives the job request that is issued by the second portable terminal apparatus from the second portable terminal apparatus, and then identifies the first portable terminal apparatus that is correlated with the device ID of that second portable terminal apparatus, and transmits the received job request to the identified first portable terminal apparatus.

2. The image forming system according to claim 1, wherein
the image forming apparatus, (a) identifies the device ID of the first portable terminal apparatus and the device ID of the second portable terminal apparatus in a scanned image that is once scanned and read, and (b) of the identified device ID of the first portable terminal apparatus and the device ID of the second portable terminal apparatus, searches for a device ID of a registered portable terminal apparatus that is able to transmit a job request to the image forming apparatus using the peer-to-peer communication method, identifies the device ID of the first portable terminal apparatus, and identifies a device ID that is not the device ID of the first portable terminal apparatus as the device ID of the second portable terminal.

3. The image forming system according to claim 2, wherein
the first portable terminal apparatus and the second portable terminal apparatus display by a display apparatus an identification screen that includes a visible code that indicates the respective device ID as an encoded device ID; and the image forming apparatus detects the visible code in the scanned image, decodes the visible code and identifies the indicated device ID.

4. The image forming system according to claim 1, wherein
the server discards registration of the second portable terminal apparatus when no job request is generated from the second portable terminal apparatus during a specified amount of time after registration of the second portable terminal apparatus.

5. An image forming apparatus that is able to receive a job request using a specified peer-to-peer communication method, comprising:
an image reading apparatus that optically scans and reads a device ID of a first portable terminal apparatus and a device ID of at least one second terminal apparatus that are respectively displayed by the first portable terminal apparatus and the second portable terminal apparatus that are placed on a platen glass; and
a wireless communication apparatus that transmits the device ID of the second portable terminal apparatus to the first portable terminal apparatus using the peer-to-peer communication method; wherein
the first portable terminal apparatus is registered in the image forming apparatus so as to be able to transmit job requests to the image forming apparatus using the specified peer-to-peer communication method; and
the second portable terminal apparatus is not registered in the image forming apparatus so as to be able to transmit a job request to the image forming apparatus using the specified peer-to-peer communication method.

6. A non-transitory computer readable recording medium that stores a computer executable program; wherein
the program causes a computer inside a first portable terminal apparatus that is registered in an image forming apparatus so as to be capable of transmitting a job request to the image forming apparatus using a specified peer-to-peer communication method to execute:
a step of receiving a device ID of a second portable terminal apparatus that is not registered in the image forming apparatus so as to be capable of transmitting a job request to the image forming apparatus using the specified peer-to-peer communication method from the image forming apparatus using the peer-to-peer communication method;
a step of correlating the received device ID of the second portable terminal apparatus with the first portable terminal apparatus and registering that device ID in the server; and
a step of receiving a job request that is issued by the second portable terminal apparatus from the server, and transmitting the received job request to the image forming apparatus using the peer-to-peer communication method.

* * * * *